(12) United States Patent
Van Dijk et al.

(10) Patent No.: US 12,297,352 B2
(45) Date of Patent: May 13, 2025

(54) POLYMER COMPOSITION AND MOLDED PART MADE THEREOF

(71) Applicant: Envalior B.V., Geleen (NL)

(72) Inventors: Hans Klaas Van Dijk, Echt (NL); Martin Wolffs, Echt (NL)

(73) Assignee: ENVALIOR B.V., Geleen (NL)

( * ) Notice: Subject to any disclaimer, the term of this patent is extended or adjusted under 35 U.S.C. 154(b) by 1040 days.

(21) Appl. No.: 16/982,782

(22) PCT Filed: Mar. 21, 2019

(86) PCT No.: PCT/EP2019/057014
§ 371 (c)(1),
(2) Date: Sep. 21, 2020

(87) PCT Pub. No.: WO2019/180107
PCT Pub. Date: Sep. 26, 2019

(65) Prior Publication Data
US 2021/0002481 A1 Jan. 7, 2021

(30) Foreign Application Priority Data

Mar. 23, 2018 (EP) ..................................... 18163755
Apr. 20, 2018 (EP) ..................................... 18168594

(51) Int. Cl.
*C08L 77/06* (2006.01)
*C08G 69/26* (2006.01)
*C08K 7/06* (2006.01)
*C08K 7/12* (2006.01)

(52) U.S. Cl.
CPC ............ *C08L 77/06* (2013.01); *C08G 69/265* (2013.01); *C08K 7/06* (2013.01); *C08K 7/12* (2013.01)

(58) Field of Classification Search
CPC ........ C08L 77/06; C08G 69/265; C08G 69/26
See application file for complete search history.

(56) References Cited

U.S. PATENT DOCUMENTS

| 5,378,800 | A | 1/1995 | Mok et al. |
| 9,296,897 | B2 | 3/2016 | Pfleghar et al. |
| 9,346,952 | B2 | 5/2016 | Aepli et al. |
| 10,611,881 | B2 | 4/2020 | Janssen et al. |
| 2006/0036044 | A1* | 2/2006 | Cheng ..................... C08L 77/02 525/432 |
| 2009/0062452 | A1* | 3/2009 | Harder ................... C08G 69/36 264/165 |
| 2011/0023986 | A1* | 2/2011 | Hoffmann ............... C08L 77/06 525/183 |
| 2014/0179849 | A1* | 6/2014 | Aepli ....................... C08K 7/14 528/323 |
| 2016/0152770 | A1 | 6/2016 | Richter et al. |
| 2016/0333144 | A1 | 11/2016 | Janssen et al. |
| 2017/0107326 | A1 | 4/2017 | Bayer et al. |
| 2019/0225760 | A1 | 7/2019 | Wang |

FOREIGN PATENT DOCUMENTS

| CN | 103881368 A | 6/2014 |
| CN | 105308096 A | 2/2016 |
| CN | 106916295 A | 7/2017 |
| JP | H06503590 A | 4/1994 |
| JP | 2015151446 A | 8/2015 |
| JP | 2016521791 A | 7/2016 |
| JP | 2017075303 A | 4/2017 |
| WO | 1998024847 A1 | 6/1998 |
| WO | 2018/060271 A1 | 4/2018 |

OTHER PUBLICATIONS

International Search Report of International Patent Application No. PCT/EP2019/057014 filed Mar. 6, 2019.

* cited by examiner

*Primary Examiner* — Gregory Listvoyb
(74) *Attorney, Agent, or Firm* — NIXON & VANDERHYE P.C.

(57) ABSTRACT

The invention relates to a polyamide polymer; to a polymer composition comprising the polyamide polymer and a fibrous reinforcing agent or a filler, or a combination thereof; to a molded part made of the polymer composition; and to an automotive vehicle comprising a load-bearing structural part made of the molded part. Herein the polyamide polymer has a glass transition temperature (Tg) of at least 145° C. and a dynamic modulus (E'), measured at a temperature (Tmod) equal to Tg+15° C., in the range of 100 MPa-700 MPa.

13 Claims, 1 Drawing Sheet

POLYMER COMPOSITION AND MOLDED PART MADE THEREOF

CROSS-REFERENCE TO RELATED APPLICATIONS

This application is a National Stage entry of International Application No. PCT/EP2019/057014, filed 21 Mar. 2019, which claims priority to European Patent Application No. 18163755.4, filed 23 Mar. 2018 and European Patent Application NO. 18168594.2, filed 20 Apr. 2018.

BACKGROUND

Field

The present invention relates to a polyamide polymer, a polymer composition comprising the polyamide polymer and a reinforcing agent and to a molded part made thereof. The invention is directed to a polymer composition that can be used in mechanically high-load-bearing plastic components, such as for aviation, automotive, constructional applications, for example engine suspension mounts, bars and frames, and engine covers and housings for engine parts.

Description of Related Art

Replacement of metal parts by plastic parts for achieving weight reduction is already used in many vehicle subsystems and components. However, plastic components are applied for non-load-bearing or moderate-load-bearing applications, and only exceptionally for medium-load-bearing applications. Continuous fiber reinforced plastics (CFRP) based on carbon fibers structures impregnated with a thermoset resin were developed approximately 35 years ago. These are used primarily in aviation applications, but are hardly used in automotive application. Insufficient fatigue properties under dynamic load conditions constituted a serious shortcoming. Steel and aluminum structures are still the first materials of choice for high-load-bearing structural elements, in particular for automotive applications. Compensation of the shortcomings of plastic materials in terms of load-bearing characteristics by increasing the dimensions of the structural parts does not bring the required weight reduction. Furthermore, load-bearing parts with multi-axle stress situations applied in automotive engine suspension must perform under severe dynamic and environmental conditions, under which the load-bearing parts are subjected to fluctuating loads, and fluctuating temperatures and to chemical exposures. Increasing the fiber content in fiber reinforced polymer compositions thus enhancing the stiffness and thereby more closely meeting mechanical properties of metals, does not bring the required solutions.

A key area for metal replacement is in engine suspension mounts and engine mounting subsystems for automobiles. Other applications in which metal parts are applied for reasons of high-load-bearing are housings and covers for, for example, engine parts. These parts do not only require a high load-bearing capacity and high dampening but in case of housing often also need a good sealing performance via high surface quality and a high burst pressure.

The plastic components shall have high rigidity and high strength, meanwhile show low creep under long term load conditions and be able to withstand large bending forces, and have good fatigue properties under dynamic load conditions. In view of the need to further reduce weight, for reasons of increasing energy prices, reducing energy consumption and reducing environmental pollution, efforts are put in further improvement of plastic materials and of design of the structural parts.

SUMMARY

A first aim of the present invention is therefore to provide a polymer composition with improved properties for use in mechanically high-load-bearing plastic components, as well as polymers that can be used therein. A further aim is to provide plastic parts with mechanically high-load-bearing properties which can be used as replacement for metal parts.

This aim has been achieved with the polyamide polymer and the polymer composition according to the invention, and with the load-bearing structural parts made thereof.

The polyamide polymer according to the invention has a glass transition temperature (Tg) of at least 145° C., and a dynamic modulus (E'), measured at a temperature (Tmod) equal to Tg+15° C., in the range of 100 MPa-700 MPa, wherein both Tg and E are measured by dynamic mechanical thermal analysis (DMTA).

The polymer composition according to the invention comprises
polyamide polymer, and
a fibrous reinforcing agent,
and optionally further components,
wherein the polyamide polymer has a glass transition temperature (Tg) of at least 145° C. and a dynamic modulus (E'), measured at a temperature (Tmod) equal to Tg+15° C., in the range of 100 MPa-700 MPa, and wherein both Tg and E are measured by dynamic mechanical thermal analysis (DMTA). Herein both the Tg and E' are measured by DMTA according to the method of ASTM-D5026-15.

DETAILED DESCRIPTION OF A PREFERRED EMBODIMENT

Figure 1:
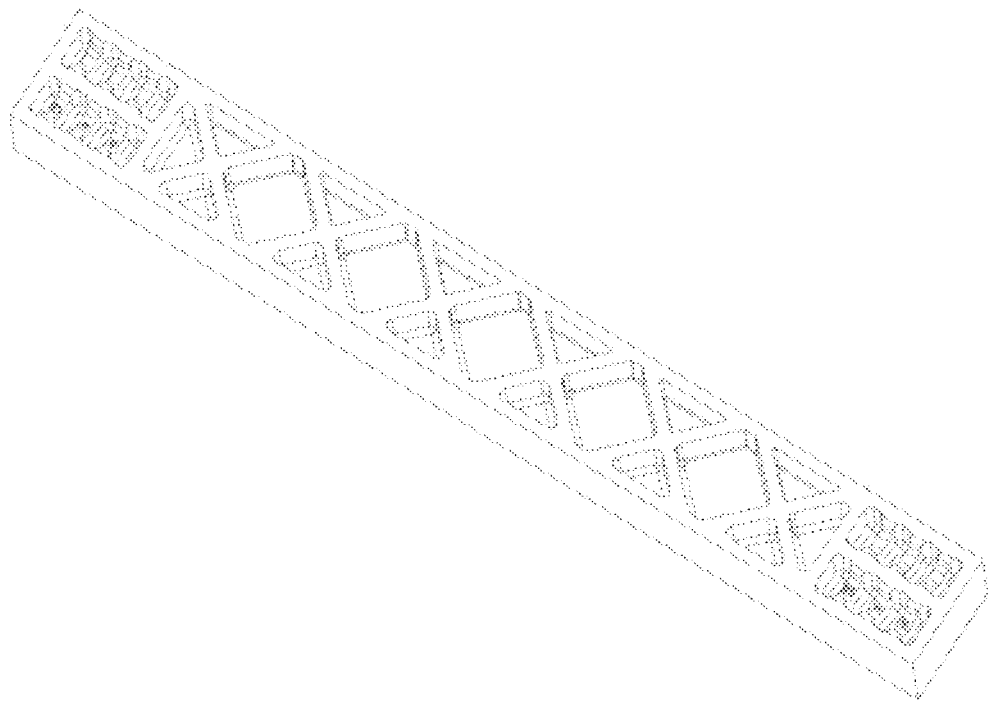
FIGS. 1-2 depict embodiments as described herein.

The effect of the polyamide polymer according to the invention is that structural parts made of the composition comprising the polyamide polymer perform better under dynamic multi-axle loads, while being exposed to fluctuating temperatures, compared to compositions comprising polyamides with a lower Tg, or compositions comprising polyamides with a higher Tg and higher E' at Tmod, or compositions comprising amorphous polyamides with high Tg with a lower E' at Tmod, even when such compositions contain a higher amount of glass fibers or are toughened with an impact modifier. Such compositions either fail in strength at low temperature or too much deformation at the application temperature. Furthermore, the compositions according to the invention show a high double notch tensile strength and a high multi-axle bending performance. These results are highly surprising in the sense that the properties of the polyamides above Tg in the compositions according to the invention have such a positive effect on the mechanical properties at ambient conditions.

Suitably, the E' at Tmod of the polyamide polymer of the present invention, and used in the composition for the load-bearing parts, is in the range of 150 MPa-700 MPa, preferably 200 MPa-650 MPa, more preferably 300 MPa-600 MPa. The advantage of a lower maximum dynamic modulus is an improved double notch tensile strength whereas a higher minimum for the dynamic modulus is favorable to limit deformation under pressure.

The polyamide polymer preferably has a glass transition temperature (Tg) of at least 150° C., preferably at least 155° C., and suitably in the range of 155° C.-175° C. or higher. A higher Tg is advantageous as it allows for applications with higher peak temperatures or higher continuous use temperatures.

In a preferred embodiment of the invention, the polyamide polymer comprises at least a semi-crystalline polyamide. Herein the polyamide polymer suitably consists of a single semi-crystalline polyamide, or of a blend of at least two miscible semi-crystalline polyamides, or of a miscible blend of at least one semi-crystalline polyamide and at least one amorphous polyamide. The semi-crystalline polyamide can be a semi-crystalline semi-aromatic polyamide or a semi-crystalline aliphatic polyamide. Herein the semi-crystalline polyamide suitably is an aliphatic polyamide consisting of repeat units derived from aliphatic monomers comprising cycloaliphatic monomers, or a semi-aromatic polyamide comprising repeat units derived from aromatic monomers and aliphatic monomers. Preferably, the polyamide polymer consists of a semi-crystalline polymer. Most preferably, the semi-crystalline polyamide is a semi-crystalline semi-aromatic polyamide.

In case the polyamide polymer consists of a miscible blend of two or more polyamides, the DMTA measurement will reveal one glass transition temperature.

With a semi-crystalline polymer is herein understood a polymer having an amorphous phase characterized by a glass transition and a crystalline phase characterized by a melting point.

Suitably, the polyamide polymer comprises a semi-crystalline semi-aromatic polyamide having a melting temperature (Tm) of at least 280° C., and preferably a Tm in the range of 300° C.-350° C.

Herein, the melting temperature (Tm) is measured by the DSC method according to ISO-11357-1/3, 2011, on pre-dried samples in an $N_2$ atmosphere with heating and cooling rate of 20° C./min. Herein Tm has been calculated from the peak value of the highest melting peak in the second heating cycle.

The polyamide polymer according to the invention comprises repeat units derived from diamine and dicarboxylic acid, and optionally repeat units derived from other monomers. The amount of such other repeat units, or other monomers, shall be kept limited to less than 5 mole %, preferably less than 3 mole %, relative to total molar amount of diamine, dicarboxylic acid and other monomers. In other words, the polyamide polymer consists of repeat units, at least 95 mole % of which, and preferably at least 97 mole % of which, are derived from diamine and dicarboxylic acid. Most preferably, the polyamide polymer comprises 98-100 mole % of repeat units derived from diamine and dicarboxylic acid, and 0-2 mole % of repeat units derived from other monomers, different from diamine and dicarboxylic acid, relative to total molar amount of diamine, dicarboxylic acid and other monomers.

The diamine and dicarboxylic acid from which said repeat units are derived, suitably comprise at least 40 mole %, preferably at least 50 mole %, more preferably at least 60 mole % of a cyclic monomer, relative to the molar amount of diamine and dicarboxylic acid.

The cyclic monomer suitably comprises an aromatic monomer, or a cycloaliphatic monomer, or a combination of aromatic monomer and cycloaliphatic monomer. Suitable aromatic monomers are aromatic dicarboxylic acids, aromatic diamines and arylalkyl diamines. Suitable cycloaliphatic monomers are cycloaliphatic diamines and cycloaliphatic dicarboxylic acids. The cyclic monomer may comprise one of an aromatic dicarboxylic acid, an aromatic diamine, an arylalkyl diamine, a cycloaliphatic diamine and a cycloaliphatic dicarboxylic acid, or any combination of two or more thereof. Preferably, the cyclic monomer comprises a combination of an aromatic dicarboxylic acid and a cycloaliphatic diamine.

The diamines and dicarboxylic acids may comprise other bifunctional monomers next to the cyclic monomers. These other bifunctional monomers suitably comprise a linear aliphatic diamine, a linear aliphatic dicarboxylic acid, a branched aliphatic diamine or a branched aliphatic dicarboxylic acid, or any combination thereof.

The polyamide polymer preferably comprises a semi-crystalline polyamide, which may be a semi-crystalline aliphatic polyamide or a semi-crystalline semi-aromatic polyamide, preferably a semi-crystalline semi-aromatic polyamide.

The cycloaliphatic monomers in the semi-crystalline aliphatic polyamide may comprise a cycloaliphatic dicarboxylic acid or a cycloaliphatic diamine, or a combination thereof. Herein the cycloaliphatic monomer is suitably combined with other aliphatic monomers, being a linear aliphatic diamine, a linear aliphatic dicarboxylic acid, a branched aliphatic diamine, or branched aliphatic dicarboxylic acid, or any combination thereof.

The aromatic monomer in the semi-aromatic polyamide suitably comprises an aromatic dicarboxylic acid, an aromatic diamine or an arylalkyl diamine, or a combination thereof. The aliphatic monomer herein can comprise linear aliphatic monomer, or branched aliphatic monomer, or cycloaliphatic monomer, or any combination thereof.

In a preferred embodiment, the semi-crystalline polyamide comprises or even consists of a semi-crystalline semi-aromatic polyamide comprising repeat units derived from diamine and dicarboxylic acid, wherein at least 95 mole % of the dicarboxylic acid is an aromatic dicarboxylic acid, or a combination of aromatic dicarboxylic acid and a cycloaliphatic dicarboxylic acid. More preferably, at least 98 mole % of the dicarboxylic acid is an aromatic dicarboxylic acid. Herein the diamines suitably comprise linear aliphatic diamines, optionally combined with one or more branched aliphatic diamines, cycloaliphatic diamines, arylalkyl diamines and aromatic diamines, or a combination thereof.

Examples of suitable linear aliphatic diamines are 1,2-ethylene diamine, 1,3-propylene diamine, 1,4-butane diamine, 1,5-pentane diamine, 1,6-hexane diamine, 1,8-octane diamine, 1,9-nonane diamine, 1,10-decane diamine, 1,11-undecane diamine and 1,12-dodecane diamine.

Examples of suitable branched aliphatic diamines are 2-methyl-1,5-pentane diamine, 3-methyl-1,5-pentane diamine, 2,2,4-trimethylhexamethylene diamine, 2,4,4-trimethylhexamethylene diamine and 2-methyl-1,8-octane diamine.

Suitable cycloaliphatic diamines are those comprising 6 to 24 carbon atoms, such as cyclohexanediamine, [for example 1,3-cyclohexyldiamine and 1,4-cyclohexyl diamine, e.g. 1,4-trans-cyclohexane diamine], bis-(aminomethyl)-cyclohexane (BAC), [for example 1,3-bis-(aminomethyl)-cyclohexane and 1,4-trans-diaminomethylcyclohexane, isophoronediamine (IPD), alkyl-substituted bis-(aminocyclohexyl)methane, [for example bis(3-methyl-4-aminocyclohexyl)methane (MACM)], bis-(aminocyclohexyl)propane, [for example bis(4-aminocyclohexyl) methane (PACM)], norbornanediamine,

[for example 2,6-norbornanediamine], norbornanedimethylamine, [for example 2,6-bis-(aminomethyl)-norbornane], 2,2-(4,4'-diaminodicyclohexyl)-propane (PACP), bis-(4-amino-3-ethyl-cyclohexyl)-methane (EACM), and bis-(4-amino-3,5-dimethyl-cyclohexyl)-methane (TMACM), or mixtures thereof.

In particular, bis-(aminomethyl)-cyclohexane (BAC), isophoronediamine (IPD), alkyl-substituted bis-(aminocyclohexyl)methane or bis-(aminocyclohexyl)propane is preferred, more particular bis(3-methyl-4-aminocyclohexyl) methane (MACM) or bis(4-aminocyclohexyl)methane (PACM), or a combination thereof.

Examples of arylalkyl diamines are meta-xylylene diamine (MXD) and para-xylylene diamine (PXD).

Examples of aromatic diamines are meta-phenylene diamine and para-phenylene diamine.

The linear aliphatic dicarboxylic acids are suitably linear aliphatic dicarboxylic acids with 4 to 18 carbon atoms; examples thereof are adipic acid, azelaic acid, sebacic acid and 1,12-dodecanedioic acid.

An example of a cycloaliphatic dicarboxylic acids is cyclohexane dicarboxylic acid, including cis and trans version and any mixtures thereof.

Examples of aromatic dicarboxylic acids are terephthalic acid (T), naphthalene dicarboxylic acid (N), biphenyl dicarboxylic acid (BDA) and isophthalic acid (I).

In a preferred embodiment, the polyamide polymer comprises, or even consists of a semi-crystalline semi-aromatic polyamide comprising repeat units derived from aromatic dicarboxylic acid and diamine, wherein the aromatic dicarboxylic acid consists of terephthalic acid, naphthalene dicarboxylic acid or biphenyl dicarboxylic acid, or a combination of at least two thereof. Herein the diamine preferably comprises a combination of a linear diamine and a branched diamine, or a linear diamine and a cycloaliphatic diamine, or a combination of a linear diamine, a branched diamine and a cycloaliphatic diamine.

In another preferred embodiment, the polyamide polymer comprises, or even consists of a semi-crystalline semi-aromatic polyamide comprising repeat units derived from aromatic dicarboxylic acid and diamine, wherein the aromatic dicarboxylic consists of a combination of isophthalic acid and one of terephthalic acid, naphthalene dicarboxylic acid and biphenyl dicarboxylic acid, or a combination of isophthalic acid and at least two of terephthalic acid, naphthalene dicarboxylic acid and biphenyl dicarboxylic acid. Herein the diamine preferably comprises at least linear C4 or linear C5 diamine (i.e. 1,4-diaminobutane or 1,4-butane diamine (DAB) (C4 linear aliphatic diamine) and 1,5-diaminopentane or 1,5-pentane diamine (PDA) (C5 linear aliphatic diamine)); or a combination of a linear diamine and a branched diamine, or a linear diamine and a cycloaliphatic diamine, or a linear diamine, a branched diamine and a cycloaliphatic diamine. More preferably, the diamine comprises at least a linear C4 or C5 diamine and a cycloaliphatic diamine.

In a further preferred embodiment, the polyamide polymer comprises, or even consists of a semi-crystalline semi-aromatic polyamide comprising repeat units derived from a combination of aromatic dicarboxylic acid and cycloaliphatic dicarboxylic acid, and diamine. Herein the aromatic dicarboxylic consists of one of terephthalic acid, naphthalene dicarboxylic acid and biphenyl dicarboxylic acid, or a combination of at least two thereof, or a combination of at least one thereof and isophthalic acid. Herein the diamine preferably comprises at least a linear diamine, or a combination of a linear diamine with at least one of a branched diamine and a cycloaliphatic diamine.

In a particular embodiment of the invention, the polyamide polymer consists of a polyamide copolymer or of a blend of two or more polyamides, wherein the copolymer or the blend has an overall composition represented by one of the notations following below, wherein X represents a linear aliphatic C4-05 diamine (comprising at least one of 1,4-butane diamine and 1,5-pentane diamine);

Y represents a linear aliphatic diamine with at least 6 carbon atoms;

Z represents a linear aliphatic diamine with at least 4 carbon atoms, wherein (Z) is at least one of (X) and (Y);

B represents a branched diamine; and

C represents a cyclic diamine;

R represents a branched diamine (B) or cyclic diamine (C), or a combination thereof;

I represents isophthalic acid; and

T represents terephthalic acid.

A first notation for a suitable overall monomer composition is:

XT/XI or XT/XI/YT/YI, or modifications thereof with a minor amount of branched diamine and or cyclic diamine, represented by the notation XT/XI/RT/RI or XT/XI/YT/YI/RT/RI, comprising 15-100 mole % of X, 0-80 mole % (Y), and 0-10 mole % (R), relative to the total molar amount of (X)+(Y)+(R), and 20-45 mole % (1) and 55-80 mole % (T), relative to the total molar amount of (I)+(T).

In a preferred embodiment the amount of (X) is 30-100 mole % and of (Y) is 0-70 mole %, relative to the total molar amount of (X)+(Y). Also preferred is that (I) is present in an amount of 20-40 mole % and (T) is present in an amount of 60-80 mole %, relative to the total molar amount of (I)+(T). Also preferred is that (R) consists of a cyclic diamine. Herein the amount of (R) may be for example, 0 mole %, 2 mole %, or 5 mole %, or 8 mole %.

When (Y) consist of a longer chain aliphatic diamine, the amount thereof is preferably further limited; for example, with (Y) being hexamethylenediamine (C6 diamine), the amount thereof preferably is at most 85 mole %, with (X) amounting at least 15 mole %, more preferably at most 70 mole %, with (X) amounting at least 30 mole %;

with (Y) being nonanediamine (C9 diamine), the amount thereof preferably is at most 75 mole %, with (X) amounting at least 25 mole %; more preferably at most 60 mole %, with (X) amounting at least 40 mole %;

with (Y) being decanediamine (010 diamine), the amount thereof preferably is at most 65 mole %, with (X) amounting at least 35 mole %; more preferably at most 50 mole %, with (X) amounting at least 50 mole %; and with (Y) being dodecanediamine (C12 diamine), the amount thereof preferably is at most max 50 mole %, with (X) amounting at least 50 mole %; more preferably at most 35 mole %, with (X) amounting at least 65 mole %.

Examples of polyamides from this first group of notations are PA-4T/6T/4I/6I, PA-5T/6T/5I/6I PA-5T/4T/5I/4I and PA-4T/10T/4I/10I, with the respective monomers present in the molar amounts indicated above.

A second notation for a suitable overall monomer composition is: ZT/CT, and modifications thereof with isophthalic acid and/or branched diamine, represented by the notation: ZT/CT/ZI/CI, ZT/CT/BT, and ZT/CT/BT/ZI/CI/BI, comprising:

0-35 mole % (I) and 65-100 mole % (T), relative to the total molar amount of (I)+(T), and either 30-90 mole % (X), 0-60 mole % (Y), 5-40 mole % (C) and 0-30 mole % (B), relative to the total molar amount of (X)+(Y)+(B)+(C); or 15 mole %-80 mole % (X), 0-70 mole % (Y), 10-40 mole % (C), and 0-30 mole % (B), relative to the total molar amount of (X)+(Y)+(B)+(C);

or 0-20 mole % (X), 10-80 mole % (Y), 15-40 mole % (C) and 0-30 mole % (B) and relative to the total molar amount of (X)+(Y)+(B)+(C).

In a first preferred embodiment thereof the amount of (X) is 30-90 mole % and of (Y) is 0-60 mole %, the amount of (C) is 10-40 mole % and of (B) is 0-20 mole % (B), relative to the total molar amount of (X)+(Y)+(B)+(C). More preferably, the amount of (X) is 30-90 mole % and of (Y) is 0-55 mole %, the amount of (C) is 15-40 mole % and of (B) is 0-10 mole % (B), relative to the total molar amount of (X)+(Y)+(B)+(C).

In a second preferred embodiment thereof, the amount of (X) is 15-80 mole % and of (Y) is 0-70 mole % (Y), the amount of (C) is 15-40 mole % and of (B) is 0-30 mole %, relative to the total molar amount of (X)+(Y)+(B)+(C). More preferably, the amount of (X) is 15-80 mole % and of (Y) is 0-65 mole % (Y), the amount of (C) is 20-40 mole % and of (B) is 0-20 mole %, relative to the total molar amount of (X)+(Y)+(B)+(C).

In a third preferred embodiment thereof, the amount of (X) is 0-20 mole % and of (Y) is 15-80 mole % (Y), the amount of (C) is 20-40 mole % and of (B) is 0-25 mole %, relative to the total molar amount of (X)+(Y)+(B)+(C). Suitably, the amount of (X) is 0-15 mole % and of (Y) is 25-70 mole % (Y), the amount of (C) is 20-40 mole % and of (B) is 10-20 mole %, relative to the total molar amount of (X)+(Y)+(B)+(C).

In a fourth preferred embodiment thereof, the amount of (I) is 10-35 mole % (I) and the amount of (T) is 65-100 mole % (T), relative to the total molar amount of (I)+(T). This fourth preferred embodiment is suitably combined with any one of the first to third preferred embodiments, or the more preferred amounts, mentioned here above.

Examples of polyamides with a composition according to the second notation are 6T/6I/MACMT/MACMI; 6T/MACMT/DT; 4T/4I/PACMT/PACMI; 4T/10T/MACMT and 6T/6I/IPDT/IPDI; with the respective monomers present in the molar amounts indicated above.

A third notation for a suitable overall monomer composition is:

ZT/BT or ZT/BT/ZI/BI, or ZT/BT/CT or ZT/BT/CT/ZI/BI/CI comprising 0-30 mole % (I) and 70-100 mole % (T), relative to the total molar amount of (I)+(T), and either 25-90 mole % (X), 0-60 mole % (Y), 10-50 mole % (B) and 0-5 mole % (C), relative to the total molar amount of (X)+(Y)+(B)+(C), or 15-80 mole % (X), 0-65 mole % (Y), 20-50 mole % (B), and 0-5 mole % (C), relative to the total molar amount of (X)+(Y)+(B)+(C), or 0-20 mole % (X), 25-70 mole % (Y), 25-50 mole % (B) and 0-5 mole % (C), relative to the total molar amount of (X)+(Y)+(B)+(C).

In a first preferred embodiment thereof, the amount of (X) is 30-90 mole % and of (Y) is 0-50 mole %, the amount of (B) is 20-50 mole % and of (C) is 0-5 mole % (B), relative to the total molar amount of (X)+(Y)+(B)+(C). More preferably, the amount of (X) is 40-80 mole % and of (Y) is 0-40 mole %, the amount of (B) is 20-40 mole % and of (C) is 0-5 mole % (B), relative to the total molar amount of (X)+(Y)+(B)+(C).

In a second preferred embodiment thereof, the amount of (X) is 15-80 mole % and of (Y) is 0-60 mole % (Y), the amount of (B) is 25-50 mole % and of (C) is 0-5 mole %, relative to the total molar amount of (X)+(Y)+(B)+(C). More preferably, the amount of (X) is 15-75 mole % and of (Y) is 0-60 mole % (Y), the amount of (B) is 25-40 mole % and of (C) is 0-5 mole %, relative to the total molar amount of (X)+(Y)+(B)+(C).

In a third preferred embodiment thereof, the amount of (X) is 10-20 mole % and of (Y) is 35-65 mole % (Y), the amount of (B) is 25-40 mole % and of (C) is 0-5 mole %, relative to the total molar amount of (X)+(Y)+(B)+(C).

In a fourth preferred embodiment thereof, the amount of (I) is 10-35 mole % (I) and the amount of (T) is 65-100 mole % (T), relative to the total molar amount of (I)+(T). This fourth preferred embodiment is suitably combined with any of the first to third preferred embodiments, or the more preferred amounts, mentioned here above.

Examples thereof are PA-4T/6T/DT, PA-4T/10T/DT, PA-5T/6T/6*T, PA-4T/4I/6T/6I/DT/DI, and PA-5T/5I/6*T/6*I with the respective monomers present in the molar amounts indicated above. Herein D represents 2-methyl-penta-methylenediamine or 3-methyl-1,5-pentanediamine or a mixture thereof, and 6* is 2,2,4-trimethylhexamethyl-enediamine or 2,4,4-trimethylhexamethylenediamine, or a combination thereof.

In the polyamides according to the above notations, the cyclic diamine (C) preferably comprises one of the group consisting of bis-(aminomethyl)-cyclohexane (BAC), isophoronediamine (IPD), bis(3-methyl-4-aminocyclohexyl)methane (MACM) and bis(4-aminocyclohexyl)methane (PACM), or a combination thereof, more preferably, bis(3-methyl-4-aminocyclohexyl)methane (MACM) or bis(4-aminocyclohexyl)methane (PACM), or a combination thereof.

In another preferred embodiment of the invention, the polyamide polymer has a composition according to any one of the above notations, wherein at least part of or all terephthalic acid is substituted by naphthalene dicarboxylic acid (N) or biphenyl dicarboxylic (BDA), or a combination thereof. With full replacement of terephthalic acid by naphthalene dicarboxylic acid (N), the notations read as follows:

First group of notations: XN/XI, XN/XI/YN/YI, XN/XI/RN/RI XN/XI/YN/YI/RN/RI;

second group of notations: ZN/CN, ZN/CN/ZI/CI, ZN/CN/BN, and ZN/CN/BN/ZI/CI/BI; and third group of notations: ZN/BN, ZN/BN/ZI/BI, and ZN/BN/CN.

It is noted that the polyamide polymers according to the above notations may contain, next to the diamines and dicarboxylic acids, small amounts of other monomer units, but only in a limited amount. Preferably, the amount thereof shall be at most 2 mole %, preferably at most 1 mole %, or even better 0-0.5 mole %, relative to the total molar amount of diamines, dicarboxylic acids and other monomers. Such other monomers may include, for example, one or more of monocarboxylic acids and monoamines, both of which can serve as end-cappers, and triamines and tricarboxylic acids, which can serve as branching agents.

In the polyamide polymers according to the above notations, (X) comprises either DAB or PDA, or a combination thereof. (Y) comprises at least one linear aliphatic diamine with at least 6 carbon atoms. (Y) may comprise a combination of at least two or more linear aliphatic diamines, with 6 or more carbon atoms. In the compositions comprising a linear aliphatic diamine with at least 6 carbon atoms, or combination of two or more diamines with 6 or more carbon atoms, (Y) preferably comprises at least 1,6-hexanediamine (HMDA). More preferably, at least 50 mole % of (Y), and even more preferably at least 70 mole %, or even at least 80 mole % of (Y) is HMDA.

In the embodiments, wherein the polyamide polymer comprises a branched aliphatic diamine (B), (B) comprises at least one type of branched diamine. (B) may comprise a combination of at least two or more different branched aliphatic diamines. Preferably, the branched diamine (B) comprises either 2-methyl-1,5-pentane diamine, 3-methyl-1,5-pentanediamine, 2,2,4-trimethyl-1,6-hexanediamine, or 2,4,4-trimethyl-1,6-hexanediamine, or any combination thereof. More preferably, at least 50 mole %, and even more preferably at least 70 mole %, or even at least 80 mole % of (B) consists of 2-methyl-1,5-pentane diamine or 3-methyl-1,5-pentanediamine, or a combination thereof.

In the embodiments, wherein the polyamide polymer comprises a cyclic diamine (C), (C) comprises at least one type of cyclic diamine. (C) may comprise a combination of at least two or more different cyclic diamines. The combination may consist of two or more cycloaliphatic diamines or two or more arylalkyl diamines, as well as of a combination of at least one cycloaliphatic diamine and at least one arylalkyl diamine. Preferably (C) comprises a cycloaliphatic diamine. Preferably, the cyclic diamine (C) comprises one of bis-(aminomethyl)-cyclohexane (BAC), isophoronediamine (IPD), bis(3-methyl-4-aminocyclohexyl)methane (MACM), and bis(4-aminocyclohexyl)methane (PACM), or a combination thereof. More preferably, at least 50 mole %, and even more preferably at least 70 mole %, or even at least 80 mole % of (C) consists of bis(3-methyl-4-aminocyclohexyl) methane (MACM) or bis(4-aminocyclohexyl)methane (PACM), or a combination thereof.

In the polyamide polymers according to the above notations, those embodiments wherein the diamine comprises at least a linear C4 or C5 diamine and a cycloaliphatic diamine are most preferred.

In the embodiments, wherein the polyamide polymer comprises a blend of semi-crystalline polyamide and amorphous polyamide, the amorphous polyamide may be an amorphous semi-aromatic polyamide or an amorphous aliphatic polyamide, or a combination thereof, and preferably is an amorphous semi-aromatic polyamide.

Examples of such amorphous polyamides are amorphous aliphatic polyamides based on a cycloaliphatic diamine and aliphatic dicarboxylic acid, and amorphous semi-aromatic polyamides based on a cycloaliphatic diamine and an aromatic dicarboxylic acid, or based on diamine and aromatic dicarboxylic acid comprising at least 50 mole % of isophthalic acid or based on branched diamine and an aromatic dicarboxylic acid, or a combination thereof.

The amorphous semi-aromatic polyamide is suitably selected from the group consisting of PA-BT/BI, PA-ZI/ZT (with I/T molar ratio at least 50/50), PA-CT and PA-CI, and blends and copolymers thereof. Herein T is terephthalic acid, I is isophthalic acid, Z is a linear diamine with at least 4 carbon atoms, B is a branched aliphatic diamine, C is a cyclic diamine. Examples of amorphous semi-aromatic polyamides are PA-6I, PA-6I/6T, PA-PACMI, PA-PACMT, PA-MACMT, PA-MACMI, PA-IPDT, PA-IPDI, PA-6*T, PA-6*I, PA-DT/DI, PA-DT and PA-DI, and copolymers thereof.

The amorphous aliphatic polyamide is suitably selected from the group consisting of PA-BQ, PA-CQ, PA-BL, PA-CL and PA-ZQ, and blends and copolymers thereof. Herein Z is a linear diamine with at least 4 carbon atoms, B is a branched aliphatic diamine, C is a cyclic diamine, L is a linear aliphatic dicarboxylic acid and Q is a cycloaliphatic dicarboxylic acid. Examples of amorphous aliphatic polyamides are PA-MACM6, PA-PACM6, PA-PACM10, and PA-IPD6. PA-MACM12 and PA-PACM12.

Preferably, the polyamide polymer comprising a blend of semi-crystalline polyamide and amorphous polyamide comprises an amorphous semi-aromatic polyamide as the amorphous polyamide.

The invention also relates to a thermoplastic polymer composition comprising a polymer. The thermoplastic polymer composition according to the invention comprises at least (a) a polyamide polymer and (b) a fibrous reinforcing agent or a filler, or a combination thereof. The polyamide polymer has a glass transition temperature (Tg) of at least 145° C. and a dynamic modulus (E'), measured at a temperature (Tmod) equal to Tg+15° C., in the range of in the range of 100 MPa-700 MPa. Herein the Tg and E' are measured by the method according to ASTM-D5026-15 described above.

With a thermoplastic polymer composition is herein understood a polymer composition that can be melt-processed, i.e. being processed with the polymer being in a melt condition upon heating, and after being melt processed can be solidified again by cooling.

The polyamide polymer in the thermoplastic polymer composition according to the invention is the polyamide polymer according to the present invention or any of the specific or preferred embodiments thereof described herein above.

With fibers are herein understood elongated bodies or elongated particulates having an aspect ratio of length (L) over width (W) of at least 10. This in contrast with fillers, which are understood to be particulates having an aspect ratio of length (L) over width (W) of less than 10.

The fibrous reinforcing agent in the thermoplastic polymer composition according to the invention may comprise, for example, fibers selected from the group consisting of glass fibers, carbon fibers, metal fibers and mineral fibers. Preferably, the composition comprises at least glass fibers or carbon fibers, or a combination thereof. The glass fibers can, for example, be selected from A-glass, C-glass, D-glass, E-glass, H-glass, M-glass, R-glass and S-glass, or any mixtures thereof. Preference is given to glass fibers made of E-glass, or a mixture of glass fibers comprising E-glass and one or more other glass fibers.

The fibers may be round, i.e. having a circular cross-section, or non-circular, for example having a flat, oval, elliptical, oblong or rectangular cross-section. Among the glass fibers, flat glass fibers are particularly preferable.

Round or circular glass fibers suitably have a diameter of 5 to 20 μm, preferably from 5 to 15 μm and particularly preferably from 6 to 12 μm. The carbon fibers suitably have a diameter of 3 to 15 μm, preferably 4 to 12 μm, particularly preferably 4 to 10 μm.

The non-circular glass fibers suitably have a cross section with a width-to-thickness aspect ratio W/T of at least 1.5, preferably at least 2, and more preferably in the range of 2.5-6. Herein W represents the width, i.e. the largest dimension of the cross section and T represents the thickness, i.e. the smallest dimension of the cross section. Herein the cross-sectional dimensions width (W) and thickness (T) are measured on a cross-section of the fibers perpendicular to the length direction of the cross section.

The composition may contain continuous fibers (rovings), long fibers (LFT fibers), chopped fibers (short fibers) or milled fibers, or any combination thereof. The chopped or short fibers suitably have a fiber length of 1 to 25 mm, preferably 1.5 to 20 mm, more preferably 2 to 12 mm and most preferably 2 to 8 mm.

Preferably, the composition comprises a combination of glass fibers and carbon fibers. Such a combination provides an optimum balance in mechanical properties, costs and weight reduction. Suitably, the fibers consist of 30-70 wt. % glass fibers and 70-30 wt. % of carbon fibers.

Also preferably, the composition comprises at least non-circular glass fibers. Suitably, the composition comprises non-circular glass fibers and either circular glass fibers or carbon fibers, or a combination thereof. In a preferred embodiment, the fibers consist of 30-70 wt. % flat glass fibers and 70-30 wt. % of circular glass fibers or carbon fibers or a combination thereof.

Fillers that may be used are all particulate fillers known to those skilled in the art. These include, in particular, particulate fillers selected from the group consisting of minerals, talc, mica, dolomite, silicates, quartz, wollastonite, kaolin, silicic acids, magnesium carbonate, magnesium hydroxide, chalk, ground glass, glass flakes, metal flakes, metal-coated particles, ground carbon fibers, ground mineral fibers, ground glass fibers, ground or precipitated calcium carbonate, lime, feldspar, barium sulfate, permanent magnetic or magnetizable metals or alloys, glass beads, hollow glass beads, hollow spherical silicate fillers and mixtures thereof.

The polymer composition suitably comprises
(a) 30-80 wt. %, preferably 40-75 wt. % of the polyamide polymer; and
(b) 20-70 wt. %, preferably 25-60 wt. % of the fibrous reinforcing agent or the filler, or the combination thereof;

herein the weight percentages are relative to the total weight of the composition.

In a preferred embodiment, the polymer composition consists of
(a) 30-80 wt. %, preferably 40-70 wt. % of the polyamide polymer;
(b) 20-70 wt. %, preferably 25-55 wt. % of the fibrous reinforcing agent or the filler, or the combination thereof; and
(c) 0-30 wt. %, preferably 0-20 wt. %, more preferably 0.01-10 wt. % of one or more other components;

wherein the weight percentages are relative to the total weight of the composition.

In a preferred embodiment, component (b) consists of 50-100 wt. % of the fibrous reinforcing agent and 50-0 wt. % of the filler. More preferably, the fibrous reinforcing agent is present in an amount of 70-100 wt. % and the filler is present in an amount of 30-0 wt. %, relative to the total weight of component (b).

The polymer composition according to the invention may comprise, next to the polyamide polymer, one or more other polymer components, i.e. other than polyamide polymer, provided that the amount thereof is kept limited, thereby retaining the good mechanical and load-bearing properties of the composition. Preferably, the polymer composition comprises at most 10 wt. %, preferably 0-5 wt. %, more preferably 0-2.5 wt. % of other polymer components. Herein the weight percentages (wt. %) are relative to the total weight of polyamide polymer and other polymer components. Other polymer components that can be used, if used at all, are, for example, polymers used as pigment carriers in pigment master batches.

Other components that may be comprised by the composition according to the invention, are, for example, flame retardants and auxiliary additives used in filled or reinforced polyamide compositions. These additives are suitably selected from the group consisting of stabilizers, [for example inorganic stabilizers, organic stabilizers, in particular antioxidants, antiozonants, light stabilizers, and UV stabilizers], light absorbers, [for example UV absorbers or UV blockers, IR absorbers and NIR absorbers], antiblocking agents, nucleating agents, crystallization accelerators, crystallization retardants, catalysts, chain regulators, defoamers, chain-extending additives, conductivity additives, release agents, lubricants, dyes, marking agents, inorganic pigments, organic pigments, carbon black, graphite, carbon nanotubes, graphene, titanium dioxide, zinc sulfide, zinc sulfate, zinc oxide, barium sulfate, photochromic agents, antistatics, mold release agents, optical brighteners, metallic pigments, and mixtures thereof.

As flame retardants, both halogen-free flame retardants and halogen-containing flame retardants can be used, and preferably halogen-free flame retardants are used.

The thermoplastic polymer composition preferably comprises a polyamide polymer having a glass transition temperature (Tg) of at least 150° C., preferably in the range of 155° C.-175° C. Also preferably, the dynamic modulus (E') of the polyamide polymer at the temperature Tmod equal to Tg+15° C. is in the range of 100 MPa-700 MPa, preferably 200 MPa-650 MPa, more preferably 300 MPa-600 MPa.

The invention also relates to a molded part, more particular to a load-bearing structural part for use in an automotive engine compartment. The molded part according to the invention is made of the polymer according to the invention or any embodiment thereof as described above. The molded part can be made by conventional molding techniques, for example injection molding, and applying standard molding conditions known to the person skilled in the art.

The load-bearing structural part according to the invention comprises at least a part made of a polymer composition according to the invention. The load-bearing structural part may comprise other parts, for example, metal insert, assembled with the polymer composition part or overmolded with the polymer composition. Eventually, the load-bearing structural part consists of the polymer composition according to the invention or any embodiment thereof as described above.

The composition according to the invention can also be used in molded parts for other applications, which can include other automotive applications as well as applications in other fields.

Examples of automotive applications in which the molded part according to the invention can be used include, without limitation to the following, seating components and seating frames, engine cover brackets, engine cradles, suspension arms and cradles, spare tire wells, chassis reinforcement, floor pans, front-end modules, steering column frames, instrument panels, door systems, body panels (such as horizontal body panels and door panels), tailgates, hardtop frame structures, convertible top frame structures, roofing structures, engine covers, housings for transmission and power delivery components, clutch slave cylinders, oil pans, airbag housing canisters, automotive interior impact structures, engine support brackets, cross car beams, bumper beams, pedestrian safety beams, firewalls, rear parcel shelves, cross vehicle bulkheads, pressure vessels such as refrigerant bottles and fire extinguishers and truck compressed air brake system vessels, hybrid internal combustion/electric or electric vehicle battery trays, automotive suspension wishbone and control arms, suspension stabilizer links, leaf springs, vehicle wheels, recreational vehicle and motorcycle swing arms, fenders, roofing frames and tank flaps.

In a preferred embodiment of the invention the composition according to the invention is used in load-bearing structural parts selected from the group consisting of engine mounts, engine covers and housings for an engine part.

The invention also relates to an automotive vehicle, comprising a molded part according to the invention as mentioned herein above. Preferably, automotive vehicle comprises an engine compartment comprising a load-bearing structural part mentioned above, and in particular being engine mounts, engine covers and housings for an engine part.

The invention is further illustrated with the following examples and comparative experiments.

Materials and Material Preparation

Base polymers were either commercially available polyamide polymers or prepared by conventional methods.

Copolymers according to the invention and comparative materials were prepared by melt blending different base polymers in an extruder under conditions to obtain a homogeneous blend.

Polymer compositions were prepared by melt blending the copolymers with glass fibers, in a 50/50 wt. % ratio, in a twin-screw extruder applying conventional compounding conditions.

Test samples were prepared by injection molding of the polymer compositions in a lab-scale injection molding apparatus equipped with an appropriate mold for the test samples, applying conventional injection molding conditions. Typical 4 mm tensile bars, width 10 mm, were prepared in accordance with ISO 527-1A.

For the DMTA measurements, samples with a thickness of 2.0 mm, a width of ±4.0 mm and a length of ±80 mm were cut out of the ISO-527-1A test bars with a water-cooled diamond saw. The dimensions were measured with the calibrated Heidenhain thickness meter. Prior to the DMTA measurements, the samples were dried for 48 h at 105° C. at 150 mbar nitrogen pressure.

As test products for testing under fluctuating loads and temperatures beam shaped products with total length of 250 mm and width and height of 30 mm were injection molded using conventional injection molding conditions. The beam shaped products are ribbed and has wall thicknesses of 3.0 mm. Radii in the product are 0.5 mm. A schematic drawing of beam shaped products as tested is shown in FIG. 1.

Test Methods

Glass Transition Temperature (Tg)

The Tg of the various polymers was measured by DMTA according to the method of ASTM-D5026-15. The dynamic mechanical analyses were carried out using a GABO Eplexor 500N test system at a frequency of 1 Hz and over a temperature ranging from −100° C. to 320° C. with a heating rate of 1° C./min. During the measurements, the storage modulus (E'), loss modulus (E") and tangent delta (tan δ) were determined as a function of temperature.

Melting Temperature (Tm)

The melting temperature (Tm) was measured by the DSC method according to ISO-11357-1/3, 2011, on pre-dried samples in an $N_2$ atmosphere with heating and cooling rate of 20° C./min. Herein Tm has been calculated from the peak value of the highest melting peak in the second heating cycle.

Dynamic Modulus (E')

The E' of the various polymer was measured by DMTA according to the method of ASTM-D5026-15. Herein the E' at the temperature Tmod equal to Tg+15° C. The dynamic mechanical analyses were carried out using a GABO Eplexor 500N test system at a frequency of 1 Hz and over a temperature ranging from −100° C. to 320° C. with a heating rate of 1° C./min. During the measurements, the storage modulus (E'), loss modulus (E") and tangent delta (tan δ) were determined as a function of temperature.

Double Notch Tensile Test

Figure 2:
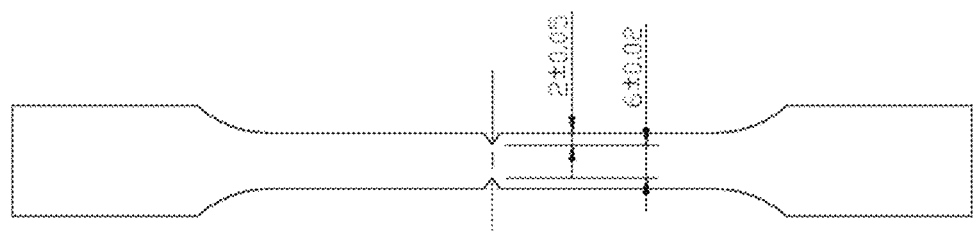

ISO 527-1A tensile bars (cross-sectional area-width×thickness-10.0±0.2×4.0±0.2 $mm^2$) were notched from two sides with a v-shaped notch with an apex (enclosed) angle of 45° and notch radius of 0.25 mm. Notch depths were 2±0.05 mm and residual cross-sectional width is 6±0.02 mm. The residual cross-sectional area is 6±0.02×4±0.2 $mm^2$. A schematic drawing of the notched test bars is shown in FIG. 2. The notched bars were tested at room temperature in 10-fold with a gripping length of 115 mm and test speed of 6.6 mm/min. Stress at break (notch strength) was calculated by dividing the maximum recorded force by the residual cross-sectional area.

Bending Test

Beams were tested at room temperature in 3-point bending with a layup span of 180 mm. The steel indenter has a radius of 15 mm, as well as the two supporting layup points. and the test performed with a loading rate of 10 mm/min. The maximum force (in Newton) prior recorded during the test is reported as the failure strength.

Results

Base polymers, polymer composition and test data for the polymers and the test samples are summarized in Table 1.

Further polymers complying with the invention and comparatives not complying with the invention are given in Table 2.

TABLE 1 different polymer compositions, glass transition temperature (Tg) and mechanical properties above Tg.

| Example/ Comparative Experiment | Polymer component I (wt %) | Polymer component II (wt %) | Notation | Monomer Ratio Diamines | Monomer Ratio Diamines | Tg (° C.) | Modulus above Tg (MPa) | Double notch results (kJ) | Bending beam test results |
|---|---|---|---|---|---|---|---|---|---|
| | 6-T/4T(65/35) | DT/DI(60/40) | | | | | | | |
| CE-A | 100 | 0 | 6T/4T | 4:6 = 35:65 | n.a. | 150 | 1100 | 120 | Not OK |
| EX-I | 80 | 20 | 4T/6T/4I/6I/DT/DI | 4:6:D = 6:50:20 | T:I = 92:8 | 156 | 520 | 163 | OK |
| EX-II | 60 | 40 | 4T/6T/4I/6I/DT/DI | 4:6:D = 0:41:39 | T:I = 84:16 | 150 | 350 | 160 | OK |
| | 6T/4T(65/35) | DT | | | | | | | |
| CE-B | 90 | 10 | 4T/6T/DT | 4:6:D = 32:58:9 | n.a. | 160 | 740 | 150 | Not OK |
| | 6T/4T(65/35) | 6I/6T(70/30) | | | | | | | |
| EX-III | 60 | 40 | 4T/6T/4I/6I | 4:6 = 22:78 | T:I = 72:27 | 146 | 480 | 174 | OK |

TABLE 2

Compositions and glass transition temperature (Tg) of other polymers according to the invention (Examples IV-VIII) and polymers not complying with the invention (Comparative Examples C-J)

| Example/ Comparative | Polymer component I (wt %) | Polymer component II (wt %) | Notation | Monomer Ratio Diamines | Monomer Ratio Diamines | Tg (° C.) |
|---|---|---|---|---|---|---|
| | 6T/6I(70/30) | MACT | | | | |
| CE-C | 100 | 0 | 6T/6I | n.a. | T:I = 70:30 | 130 |
| EX-IV | 80 | 20 | 6T/6I/MACT/MACI | 6:MAC = 5:15 | T:I = 75:25 | 145 |
| CE-D | 60 | 40 | 6T/6I/MACT/MACI | 6:MAC = 67:33 | T:I = 80:20 | 165 |
| | 6T/6I(70/30) | IPDT | | | | |
| EX-V | 70 | 30 | 6T/6I/IPDT/IPDI | 6:IPD = 74:26 | T:I = 78:22 | 152 |
| CE-E | 50 | 50 | 6T/6I/IPDT/IPD1 | 6:IPD = 55:45 | T:I = 84:16 | 171 |
| | 9T | MACT | | | | |
| CE-F | 100 | 0 | 9T | n.a. | n.a. | 125 |
| EX-VI | 70 | 30 | 9T/MACT | 9:MAC = 70:30 | n.a. | 149 |
| CE-G | 50 | 50 | 9T/MACT | 9:MAC = 49:51 | n.a. | 172 |
| | 10T | IPDT | | | | |
| CE-H | 100 | 0 | 10T | n.a. | n.a. | 125 |
| EX-VII | 60 | 40 | 10T/IPDT | 10:IPD = 60:40 | n.a. | 156 |
| CE-I | 40 | 60 | 10T/IPDT | 10:IPD = 40:60 | n.a. | 179 |
| | 6T/4T(65/35) | DT | | | | |
| EX-VIII | 70 | 30 | 4T/6T/DT | 4:6:D = 25:46:29 | n.a. | 160 |
| | 6T/4T(65/35) | 6I/6T(70/30) | | | | |
| CE-J | 80 | 20 | 4T/6T/4I/6I | 4:6 = 28:72 | T:I = 7:13 | 151 |

The invention claimed is:

1. A polyamide polymer comprising a blend of at least two polyamides having an overall monomer composition represented by one of the notations ZT/CT, ZT/CT/ZI/CI, ZT/CT/BT, and ZT/CT/BT/ZI/CI/BI, wherein
   X represents a linear aliphatic C4-C5 diamine
   Y represents a linear aliphatic diamine with at least 6 carbon atoms,
   Z represents a linear aliphatic diamine with at least 4 carbon atoms,
      wherein (Z) is at least one of (X) and (Y);
   I represents isophthalic acid;
   T represents terephthalic acid;
   B represents a branched diamine; and
   C represents a cyclic diamine, and wherein
   the polyamides comprise:
   0-35 mole % (I) and 65-100 mole % (T), relative to the total molar amount of (I)+(T), and either
   15 mole %-80 mole % (X), 0-70 mole % (Y), 10-40 mole % (C), and 0-30 mole % (B), relative to the total molar amount of (X)+(Y)+(B)+(C); or
   0-20 mole % (X), 10-80 mole % (Y), 15-40 mole % (C) and 0-30 mole % (B) and relative to the total molar amount of (X)+(Y)+(B)+(C) with the proviso that Y represents a linear aliphatic diamine with 9 or 10 carbon atoms, and wherein
   the polyamide polymer has a glass transition temperature (Tg) of at least 145° C. and a dynamic modulus (E'), measured at a temperature (Tmod) equal to Tg+15° C., in the range of 100 MPa-700 MPa, wherein both Tg and E are measured by dynamic mechanical thermal analysis (DMTA) according to the method of ASTM-D5026-15.

2. The polyamide polymer according to claim 1, wherein E' at Tmod is in the range of 200 MPa-650 MPa, and/or wherein the polyamide polymer has a glass transition temperature (Tg) of at least 150° C.

3. The polyamide polymer according to claim 1, wherein the polyamide polymer comprises a semi-crystalline semi-aromatic polyamide having a melting temperature (Tm) of at least 280° C.

4. The polyamide polymer according to claim 1, comprising repeat units, at least 95 mole % of which are derived from diamine and dicarboxylic acid, wherein at least 40 mole % of the repeat units, relative to the molar amount of diamine and dicarboxylic acid, are derived from a cyclic monomer.

5. The polyamide polymer according to claim 4, wherein the cyclic monomer comprises an aromatic monomer, a cycloaliphatic monomer, or a combination of an aromatic monomer and a cycloaliphatic monomer.

6. A polymer composition comprising:
   (a) the polyamide polymer according to claim 1; and
   (b) a fibrous reinforcing agent or a filler, or a combination thereof; wherein
   the polyamide polymer has a glass transition temperature (Tg) of at least 145° C. and a dynamic modulus (E') at a temperature (Tmod) equal to Tg+15° C., of at most 700 MPa, and wherein both the Tg and E' are measured by DMTA, with the method according to ASTM-D5026-15.

7. The polymer composition according to claim 6, wherein the fibrous reinforcing agent comprises glass fibers, carbon fibers, or a combination thereof.

8. The polymer composition according to claim 6, wherein the polymer composition comprises
   (a) 30-80 wt. % of the polyamide polymer, and
   (b) 20-70 wt. % of the fibrous reinforcing agent or the filler, or the combination thereof; wherein
   the weight percentages are relative to the total weight of the polymer composition.

9. The polymer composition according to claim 6, wherein the glass transition temperature (Tg) of the polyamide polymer is at least 150° C., and/or the dynamic modulus (E') at the temperature Tmod equal to Tg+15° C. is in the range of 100 MPa-700 MPa.

10. A molded part comprising the polymer composition according to claim 6.

11. The molded part according to claim 10, wherein the molded part is a load bearing structural part for use in an automotive engine compartment.

12. The molded part according to claim 11, wherein the load bearing structural part is an engine mount, an engine cover or a housing for an engine part.

13. An automotive vehicle which comprises the molded part according to claim 10.

* * * * *